(12) United States Patent
Trezzo et al.

(10) Patent No.: US 11,531,484 B1
(45) Date of Patent: *Dec. 20, 2022

(54) DISTRIBUTED DATASET MODIFICATION, RETENTION, AND REPLICATION

(71) Applicant: Twitter, Inc., San Francisco, CA (US)

(72) Inventors: Chris Trezzo, Foster City, CA (US);
Jason Sprowl, San Francisco, CA (US);
Joep Rottinghuis, Redwood City, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,600

(22) Filed: Apr. 12, 2021

Related U.S. Application Data

(63) Continuation of application No. 16/248,640, filed on Jan. 15, 2019, now Pat. No. 10,976,950.

(51) Int. Cl.
*G06F 3/06* (2006.01)

(52) U.S. Cl.
CPC ............ *G06F 3/0644* (2013.01); *G06F 3/067* (2013.01); *G06F 3/0608* (2013.01)

(58) Field of Classification Search
CPC ....... G06F 3/0644; G06F 3/0608; G06F 3/067
See application file for complete search history.

(56) References Cited

U.S. PATENT DOCUMENTS

| | | | |
|---|---|---|---|
| 6,321,238 B1 * | 11/2001 | Putzolu | G06F 16/27 |
| 6,341,340 B1 * | 1/2002 | Tsukerman | G06F 16/27 |
| | | | 707/E17.007 |
| 7,281,084 B1 | 10/2007 | Todd et al. | |
| 7,610,437 B2 * | 10/2009 | Sinclair | G06F 3/0652 |
| | | | 711/104 |
| 7,984,084 B2 * | 7/2011 | Sinclair | G06F 16/1847 |
| | | | 707/818 |
| 8,285,918 B2 * | 10/2012 | Maheshwari | G06F 12/0891 |
| | | | 711/159 |
| 8,443,263 B2 * | 5/2013 | Selinger | G06F 11/1068 |
| | | | 714/768 |
| 8,527,468 B1 | 9/2013 | Crafford et al. | |
| 8,873,284 B2 * | 10/2014 | Sinclair | G06F 12/0246 |
| | | | 365/185.11 |
| 9,223,693 B2 * | 12/2015 | Sinclair | G06F 12/0246 |
| 9,336,133 B2 * | 5/2016 | Sinclair | G06F 12/0246 |

(Continued)

*Primary Examiner* — Christopher D Birkhimer
(74) *Attorney, Agent, or Firm* — Fish & Richardson P.C.

(57) ABSTRACT

Methods, systems, and apparatus, including computer programs encoded on computer storage media, for data retention and modification. One of the methods includes dividing partitions into a set of generations according to a retention policy; accumulating modification and deletion events that define changes to be applied to data of the distributed dataset; and when a triggering event occurs for a triggered generation in the set of generations, rolling an oldest partition out of the triggered generation, the rolling comprising: if the oldest partition has reached the end of a retention period for the dataset, marking the oldest partition for deletion in the triggered generation; otherwise: creating a new partition corresponding to the data of the oldest partition, wherein the data is cleaned using a scrubbing process; adding the new partition to a next generation in the set of generations; and marking the oldest partition for deletion in the triggered generation.

21 Claims, 8 Drawing Sheets

(56) References Cited

U.S. PATENT DOCUMENTS

| | | | |
|---|---|---|---|
| 9,348,746 B2* | 5/2016 | Sinclair | G06F 12/0246 |
| 9,465,731 B2* | 10/2016 | Sinclair | G06F 3/0688 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 9,892,803 B2* | 2/2018 | Reed | G06F 12/0842 |
| 9,971,529 B1 | 5/2018 | LeCrone et al. | |
| 10,108,543 B1* | 10/2018 | Duggal | G06F 11/1453 |
| 10,108,544 B1* | 10/2018 | Duggal | G06F 11/14 |
| 10,120,613 B2* | 11/2018 | Sinclair | G06F 12/02 |
| 10,133,490 B2* | 11/2018 | Sinclair | G06F 3/0655 |
| 10,430,279 B1* | 10/2019 | Dittia | G06F 3/0656 |
| 10,795,812 B1* | 10/2020 | Duggal | G06F 3/067 |
| 10,891,228 B2* | 1/2021 | Steinmacher-Burow | G06F 12/0817 |
| 10,983,715 B2* | 4/2021 | Sharoni | G06F 3/0631 |
| 2006/0004957 A1* | 1/2006 | Hand, III | G06F 12/0866 711/E12.019 |
| 2007/0033325 A1* | 2/2007 | Sinclair | G06F 3/0608 711/170 |
| 2007/0088923 A1 | 4/2007 | Armstrong-Crews et al. | |
| 2007/0204119 A1 | 8/2007 | Murotani | |
| 2008/0082596 A1* | 4/2008 | Gorobets | G06F 12/0253 |
| 2008/0189477 A1* | 8/2008 | Asano | G06F 12/0246 711/E12.008 |
| 2009/0043831 A1* | 2/2009 | Antonopoulos | G06F 3/0614 |
| 2009/0276588 A1* | 11/2009 | Murase | G06F 3/0647 711/E12.071 |
| 2011/0055559 A1 | 3/2011 | Li et al. | |
| 2011/0145473 A1* | 6/2011 | Maheshwari | G06F 12/0873 711/E12.008 |
| 2011/0161784 A1* | 6/2011 | Selinger | G06F 11/1016 714/E11.002 |
| 2013/0238575 A1 | 9/2013 | Amarendran et al. | |
| 2014/0006688 A1* | 1/2014 | Yu | G11C 16/10 365/185.03 |
| 2014/0325148 A1* | 10/2014 | Choi | G06F 3/0659 711/114 |
| 2014/0365719 A1* | 12/2014 | Kuzmin | G06F 12/0246 711/103 |
| 2015/0227602 A1* | 8/2015 | Ram | G06F 11/1456 707/634 |
| 2016/0246713 A1* | 8/2016 | Choi | G06F 3/0608 |
| 2017/0123655 A1* | 5/2017 | Sinclair | G06F 3/061 |
| 2018/0189001 A1 | 5/2018 | Akirav et al. | |
| 2018/0203612 A1 | 7/2018 | Kats et al. | |
| 2020/0089420 A1* | 3/2020 | Sharoni | G06F 3/0631 |
| 2020/0310686 A1* | 10/2020 | Truong | G06F 3/067 |

\* cited by examiner

DISTRIBUTED DATASET MODIFICATION, RETENTION, AND REPLICATION

CROSS-REFERENCE TO RELATED APPLICATIONS

This application is a continuation application of, and claims priority to, U.S. patent application Ser. No. 16/248,640, for "DISTRIBUTED DATASET MODIFICATION, RETENTION, AND REPLICATION," filed on Jan. 15, 2019, now allowed. The disclosure of the foregoing application is incorporated here by reference.

BACKGROUND

This specification relates to big dataset retention and modification.

A large dataset can be any large collection of data, e.g., a collection of files, a set of data from tables in a database, or multiple tables from one or more databases. Conventional big data technologies, e.g., Hadoop, allow users to store data in a distributed file system, e.g., Hadoop distributed file system (HDFS), across many disks, servers, or clusters of servers.

Data in such distributed file systems or databases can be stored in immutable partitions, meaning that once the data is created and written into a partition, the partition cannot be changed. For example, unlike other conventional database structures where individual data records can be modified, updating a record in a particular partition can require reading the entire partition and writing a new partition with both the unmodified data and the updated record.

SUMMARY

This specification describes technologies for data retention and modification in large datasets. These technologies generally involve scrubbing data to modify or delete the data within a defined time period. For example, an organization may employ a data retention policy, which is a recognized protocol within an organization for retaining information for operational use while ensuring adherence to the laws and regulations concerning data retention.

Aa part of, or in addition to, organizational retention policies, different legal requirements can be imposed on data retention. For example, these requirements can specify overall retention time as well as requirements for handling personally identifiable information (PII). For example, personally identifiable information for a user may need to be updated or deleted from all data storage within a specified time limit from a corresponding user request, e.g., 30 days, which may be less than the overall retention time for data generally. One such legal regulation regarding data retention and personally identifiable information is the General Data Protection Regulation (GDPR) passed by the European Union (EU).

In a large dataset, for example, using HDFS, many thousands of files can be written to a given partition. For example, data associated with many different users of a system can be written to a partition over the course of a specified time period, e.g., 1 day, 1 hour, or a specified number of minutes. After that time, the partition is immutable. In response to a user request to delete PII, the entire partition is rewritten to remove the individual data in the partition associated with that user. Consequently, even though only a tiny percentage of the data may need to be updated or deleted, the resulting amount of writes is much larger. This is referred to as write-magnification.

Data scrubbing, also called data cleansing, is the process of modifying or removing data in a file system or database that is incorrect or incomplete, or that needs to be updated or removed. Using the approach detailed in this specification, a dataset can be scrubbed without re-writing the entire dataset or using a great deal of system resources. In particular, a portion of the dataset, e.g., one or more partitions, can be scrubbed periodically on a rolling basis such that all partitions are scrubbed within the limits imposed by the data retention policies or legal requirements.

In general, one innovative aspect of the subject matter described in this specification can be embodied in methods for data retention and modification of a distributed dataset stored in partitions according to a retention policy that include the actions of dividing the partitions into a set of generations according to the retention policy; accumulating modification and deletion events that define changes to be applied to data of the distributed dataset; and when a triggering event occurs for a triggered generation in the set of generations, rolling an oldest partition out of the triggered generation, the rolling comprising: if the oldest partition has reached the end of a retention period for the dataset, marking the oldest partition for deletion in the triggered generation; otherwise: creating a new partition corresponding to the data of the oldest partition, wherein the data is cleaned using a scrubbing process; adding the new partition to a next generation in the set of generations of the dataset; and marking the oldest partition for deletion in the triggered generation.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The set of generations includes a number of generations determined based on an overall retention period of the dataset and an active size of a generation. Marking the oldest partition for deletion includes marking the oldest partition inactive in the generation for a time period limited by a specified deletion period. Dividing the dataset partitions into the set of generations structures includes associating each dataset partition with metadata that includes generation information and information about when the dataset partition was created. Adding the new partition to a next generation in the set of generations of the dataset includes associating the new partition with metadata that represents the clean time and generation information of the new partition. The scrubbing process is associated with at least one of the accumulated modification and deletion events.

The method further includes: determining whether the oldest partition reached the end of a retention period for the dataset by: determining whether the oldest partition has reached the maximum age in the triggered generation and the triggered generation is a last generation in the set of generations. In response to obtaining an event: identifying one or more partitions containing data associated with the event; generating one or more respective scrubbing tasks for modifying the data in the one or more partitions; and executing the respective scrubbing tasks on a schedule based on a rolling window of partition scrubbing. The method further includes: determining that a problem has occurred in creating a new partition corresponding to the oldest partition; and performing a partition roll back on the oldest partition to restore the data prior to creating the new partition.

The subject matter described in this specification can be implemented in particular embodiments so as to realize one or more of the following advantages. A data retention and modification system allows data stored in immutable data partitions of a dataset to be changed within a specific period without having to change all the data partitions of the distributed dataset at once. Scrubbing portions in a periodic and structured manner allows for even distribution of resource load. By contrast, performing an update of the entire dataset each time a modification occurs f results in inefficiencies in resource allocation as several days can be spent rewriting an entire large dataset. The data retention and modification system of this specification does not require 100% storage overhead as when rewriting the entire dataset at the same time. Moreover, on very large datasets, such a full rewrite can take a substantial amount of time relative to the scrubbing period for removing particular data, e.g., two weeks, which would mean that, for a 30 day scrubbing period, as soon as full rewrite is completed it would nearly be time to start processing the next rewrite. Thus, such a system could require two separate copies of the dataset, one being used and one being updated. By contrast, the techniques described in this specification spread out the resource usage and reduces storage overhead since only a portion of the dataset is being rewritten at any given time, e.g., the data of a particular partition may only be re-written once every 21 days and different partitions are re-written on different days. Furthermore, the techniques described in this specification allow for each partition to be rewritten only once during a given scrubbing period, e.g., once every 30 days. Therefore, the data retention and modification system provides technical advantages over conventional approaches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes data retention and modification systems and methods for scrubbing data of datasets stored in immutable data partitions.

The data retention and modification system, as described, is a framework for ensuring that PII is scrubbed, e.g., updated or removed, from all storage locations within a specified time period. This allows for systems with private user data to comply with privacy policies and requirements, e.g., GDPR requirements, and ensure that user data is scrubbed, e.g., modified or deleted, within a defined period according to the defined policies and requirements.

In customary relational databases, modifying and deleting data from a dataset is straight forward. The system merely finds the record to be updated or deleted within the dataset and makes the appropriate changes to the individual record.

In large datasets, data may be stored in immutable partitions and may be distributed across multiple file systems or databases. To make changes to data stored in immutable partitions, the entire partition must be re-written. Moreover, in systems where data is written to partitions on a time basis, PII that needs to be updated or removed can be stored in many different partitions. Thus, the re-writing process can be time consuming and resource intensive.

The data retention and modification system of this specification uses a rolling window approach to data scrubbing that is efficient in terms of time and resources.

Figure 1A:
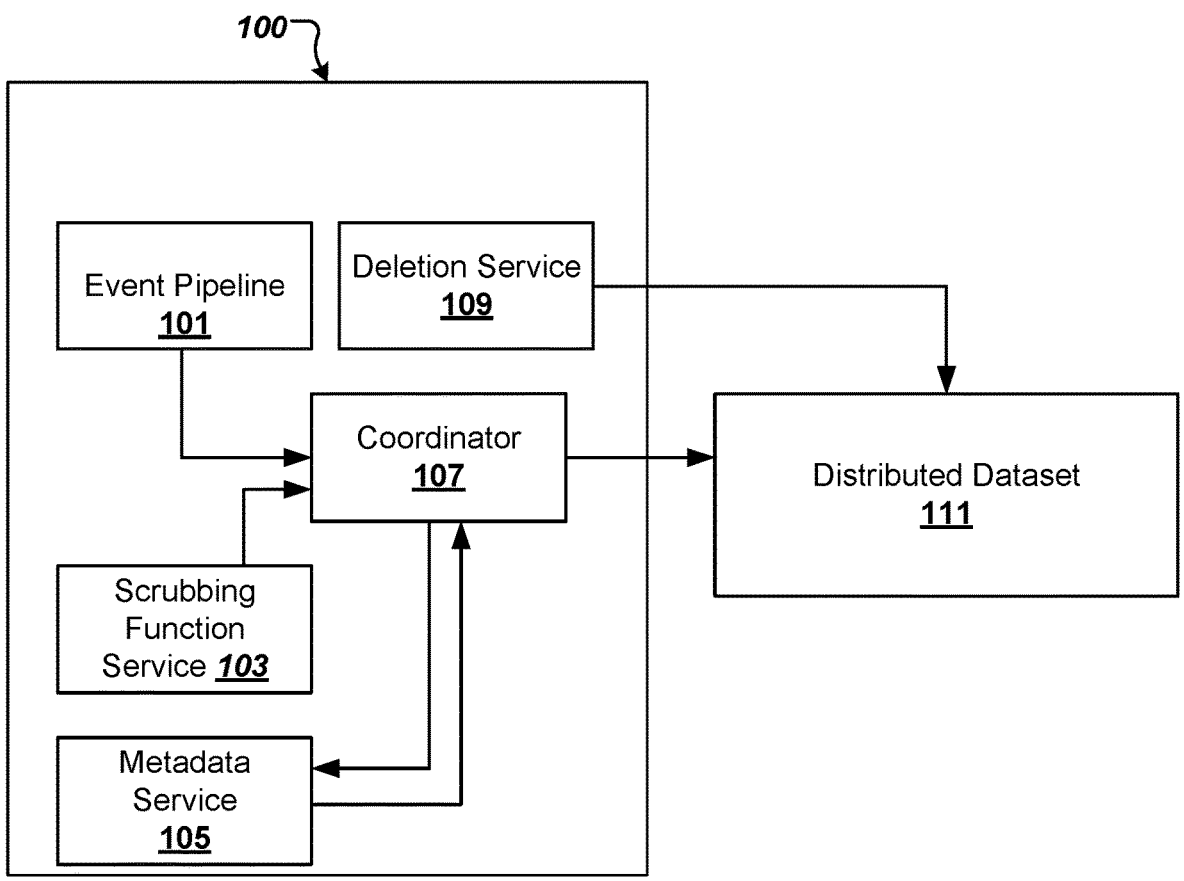
FIG. 1A is a diagram of an example data retention and modification system.

FIG. 1A is a diagram of an example data retention and modification system 100 used to perform data retention and modification operations with respect to a partitioned dataset 111. The system 100 can be implemented as computer programs on one or more computers in one or more locations, in which the systems, components, and techniques described below can be implemented.

The partitioned dataset 111 may store data for a distributed file system or database. The partitioned dataset 111 contains data from one or more data sources including raw logs, derived time portioned datasets, derived snapshot datasets, rolling snapshot datasets, and unstructured ad-hoc datasets. For example, a particular dataset can store data for a social messaging platform, e.g., messages posted to the social messaging platform by respective user accounts.

As the system 100 obtains data for a specific dataset, the system adds the data to a currently filling partition of the dataset. The partitioned dataset can be associated with data that is stored upon receipt to a partition for each specified block of time, e.g., once per day, once per hour, or once every specified number of minutes. For example, a partitioned dataset associated with a social messaging platform in which messages posted to the social messaging platform for many different users are written, contemporaneously with their posting, to respective partitions. After a specified period of time, the partition is made immutable and a new partition is created to store subsequently posted messages and so on. The system 100 associates data of each partition with metadata that specifies a generation to which the partition belongs, partition information, and a time at which the data was last scrubbed to remove deleted data and update data. The metadata can also indicate what scrubbing events are in the current scrubbing period for the partition.

A metadata service 105 of the system 100 stores the generated metadata for each partition. For example, data of a particular partition that is in a first generation of the dataset may be associated with the metadata "/user/service/dataset/gen0/yyyy/MM/dd/HH." This metadata specifies a user account so that PII of an individual user can be identified for deletion or update, the service to which the dataset pertains, the dataset, the generation, here generation zero, and the date on which the partition was created. The metadata provides enough information to uniquely identify partitions of the data within a generation. A generation is a logical construct that divides the portions of the dataset where each generation includes a specified number data partitions for a given amount of time, which can depend on the particular data scrubbing policies in place. For example, in some implementations, each generation holds 21 partitions. Similarly, the number of generations can be determined based on the overall retention period and the number of partitions in each generation.

For example, an overall retention policy can be 90 days, where the data initially written to the dataset is deleted after a maximum of 90 days, although it may be deleted earlier in response to a request to scrub particular data, e.g., a delete request for PII associated with a particular user account. To ensure that the PII is scrubbed within a specified time limit, e.g., 30 days, the dataset can be logically divided into three generations each having 21 partitions. Although in this example, this provides a retention of 63 days, each generation can further be provided with a nine day deletion period, as described in greater detail below, resulting in a maximum possible time to deletion of 90 days. Other systems may require different deletion periods depending, for example, on the system resource capabilities and the size of each partition.

The system also includes an event pipeline 101 that provides deletion and modification events to the data retention and modification system 100 on which the system acts. The event pipeline 101 provides information regarding user deactivations, data deletions, and data modifications. For example, events can be provided to the event pipeline by components of a social messaging platform that receive instructions from user accounts, e.g., data updates or requests for deletions. An event associated with PII can include a user request for deletion of an account or for an update to particular data associated with the account. These components can include logic to determine when a deletion or update event has occurred and logs them to the event pipeline 101.

The system can periodically aggregate events added to the event pipeline over a specified period of time. For example, the system can aggregate on a daily basis the events received for the past 30 days. Additionally, different types of events can be aggregated separately, for example, particular types of deletion events or update events can be aggregated in separate datasets.

The system 100 modifies or deletes data in accordance with these events. Each event associates a user, a timestamp, and an action to take on the data. For example, the event pipeline 101 may receive an event to delete a user account. The pipeline 101 will provide the event information to the coordinator 107. The coordinator 107 has two main responsibilities: (1) identifying partitions that need to be cleaned and (2) launching scrubbing tasks to clean partitions. In some implementations, the coordinator is provided by a YARN Application Master or other suitable technology.

The coordinator 107 ensures that each partition is scrubbed at least once every scrubbing period, e.g., at least once every 30 days. In particular partition, the coordinator 107 can determine whether the partition has been scrubbed within a specified period of time to ensure that it is scrubbed every 30 days. If not, the partition is scrubbed based on the aggregated events from the event pipeline 101, which corresponds to the events that have been received since the last scrubbing operation was performed on the data of the partition.

The coordinator 107 uses the metadata service 105 in order to determine what data in the partitioned dataset 111 to scrub for a given event.

For example, when the coordinator 107 determines that a particular partition is to be scrubbed the coordinator 107 obtains events received since the last scrubbing operation from the event pipeline 101 and then uses the metadata service 105 to determine which of those events have corresponding user account data in the partition.

The coordinator 107 can further communicate with a scrubbing function service 103 to determine the appropriate scrubbing tasks to use on the partition. The scrubbing function service 103 is shown as a separate component from the coordinator. However, in some implementations, the scrubbing function service is part of the coordinator 107.

Each scrubbing task is created to c perform a scrubbing operation on the partition by applying one or more transformation functions to remove deleted records and fields from that partition. The scrubbing tasks are scheduled according to the particular partitions that need to be scrubbed. In particular, the scrubbing tasks are scheduled according to a rolling window scrubbing scheme that scrubs partitions on a rolling basis as will be described below with respect to the scrubbing process.

Thus, the scrubbing tasks are not carried out for a particular event on all affected partitions at once, but instead are spread out based on what partitions are up for scrubbing according to the rolling scrubbing scheme. Therefore, a user account deletion event may include many scrubbing tasks carried out over several days depending on the particular partitions holding the data and the location of those partitions in the generations.

Although FIG. 1A shows a coordinator 107 coordinating the cleaning of data within a dataset, in some implementations, the system 100 executes without a centralized coordinator. In systems without a coordinator, each application managing user data stored in the dataset is responsible for looking up metadata associated the partitioned dataset 111 and determining which partitions need to be scrubbed at a given time. Each application is also responsible for initiating execution of an appropriate scrubbing function. Once scrubbing is complete, the application also updates the metadata for the scrubbed dataset partitions to reflect the most recent time that the partitions were scrubbed.

The system 100 of FIG. 1A additionally includes a deletion service 109 that deletes old partitions that have aged out of a respective generations of the partitioned dataset and reached the end of the dataset's overall retention period at the end of the last generation.

In some implementations, the use of a separate coordinator component is not necessary. For example, a metadata service can keep track of all the information, or there can be a particular scrubber set up for each partition. Each scrubbed partition can named after a log category and an hour in which the original information was written. As a result, all the information will be available by inspecting a state of the file system.

For example, the system can look at the oldest partitions in a generation and check if there is a corresponding partition (by name) in the next generation. If so, the partition is already scrubbed and can be deleted after a specified deletion period.

If there is not a corresponding partition in the next generation, the partition needs to be scrubbed. By always scrubbing from the oldest to the latest partitions the system can reconstruct the order and follow progress without a need to store metadata separately.

In such an implementation, the system would have one scrubber scrubbing one partition at a time within a generation, where multiple generations can be processed in parallel. Additionally, with a metadata system, the system doesn't need to adhere to an order where scrubbing occurs one at a time per partition for each generation. Potentially each partition can be scrubbed in parallel.

Figure 1B:
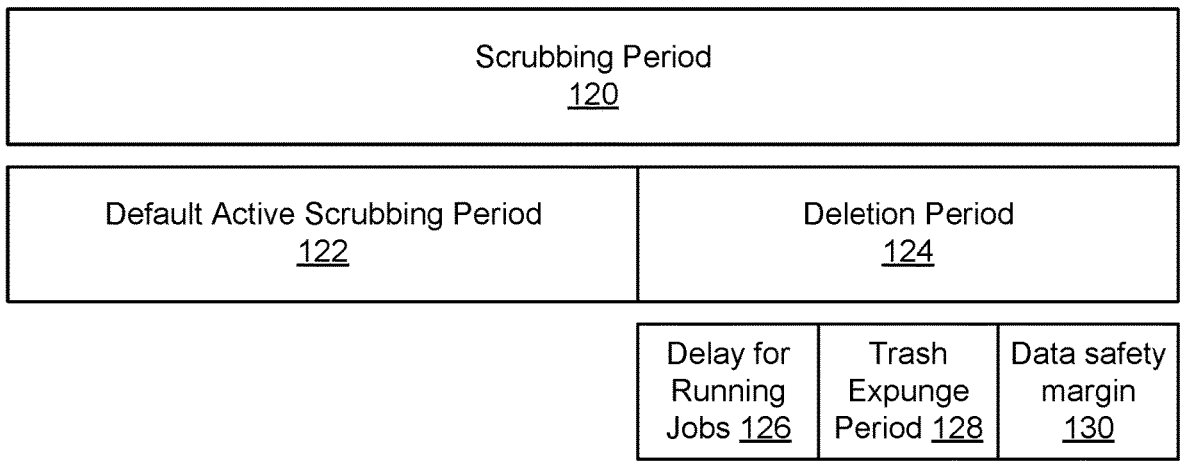
FIG. 1B illustrates aspects of managing data for an example retention policy.

FIG. 1B is a diagram that illustrates aspects of managing data for an example scrubbing policy. The scrubbing policy, e.g., a scrubbing policy based on the GDPR requirements, can have a scrubbing period 120 that is a set time limit, e.g., 30 days, identifying a grace period for how long personal data may be kept in any dataset after deletion of the data has been requested. To satisfy the scrubbing period 120, data is available during a default scrubbing period 122, for example 21 days. This is followed by a deletion period 124, for example 9 days, so that the combination of the default scrubbing period 122 and the deletion period 124 satisfies the overall scrubbing period 120. In particular, this corresponds to a generation of partitions where after a partition reaches 21 days since creation, it undergoes a scrubbing operation to delete or update information, including PII, for which scrubbing tasks have been identified in response to received events. While in some implementations, PII in a partition can be anonymized through deletion, it can also be anonymized by updating the partition using other techniques such as tokenization, e.g., a pseudo-anonymization technique that allows for the removal of PII while maintaining referential integrity with datasets.

The deletion period 124 is made up of several phases to ensure that data is only deleted when a user or application determines that the data should actually be permanently deleted. In a first phase of the deletion period 124 is a delay for running jobs 126. This allows for any jobs that are running to finish processing the data that is being deleted. For example, to allow for running jobs, data that reaches the end of the 21 day default scrubbing period 122 can be maintained for a 3 day delay for running jobs 126.

At the end of the first phase, the deletion service will delete the data during an expunge time period 128. This period can be, for example, 4 days to account for an expunge time that gives a margin to recover from bugs or other errors in the deletion servers as well as extra time for users to recover data from the trash, e.g., if a user changes their mind about the deletion. In relation to a given generation, this expungement corresponds to a deletion of the oldest partition. A scrubbed version of the partition may have already been written to a new generation, e.g., at 21 days, thus, this partition has reached the end of the generation and is being removed. Following this expunge time is a data safety margin 130. The data safety margin period can be, e.g., 2 days, to ensure that the system meets the deletion requirements of the overall scrubbing policy even if the deletion service falls behind. Thus, the default scrubbing period 122 plus the deletion period 124 equals the overall scrubbing period 120.

Figure 2:
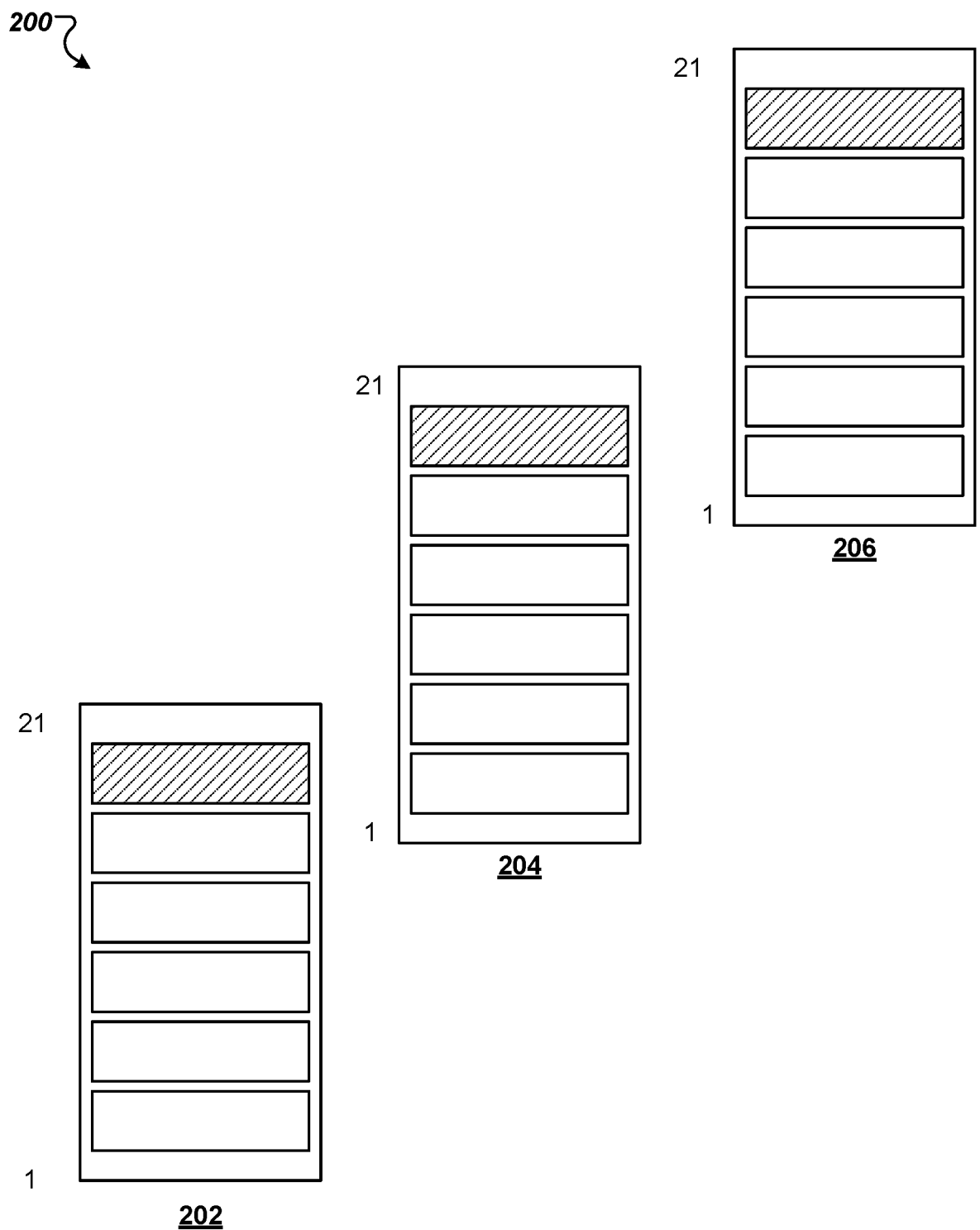
FIG. 2 illustrates an example of immutable data partitions divided into a set of generations.

To facilitate implementation of a specific scrubbing policy, a dataset that is stored in immutable partitions has the partitions assigned to generations as illustrated in FIG. 2. As described above, generations are logical constructs that are defined by a specific number of data partitions. The number of generations is determined by the overall retention period of the dataset divided by the active size of a generation, which corresponds to the scrubbing period. For example, if an overall retention period is 90-days and each active size of a generation is 30-days, the dataset will need divided into three generations each having a 30 day scrubbing period. A new dataset can build this generational structure over time by filling a first generation with created partitions and periodically rolling the partitions over to subsequent generations.

FIG. 2 illustrates these three generation 202, 204, 206 that each hold 21-days of partitions for a particular dataset, allowing for a 9 day deletion period at the end of each 21 day old partition as described above. As partitions are added, e.g., each day, to the dataset and the generation scheme of the dataset, the oldest partition of each generation also undergoes a scrubbing operation to clean the data based on the events known by the data retention and modification system up to the current time. Therefore, even though partitions are added to each generation, the overall number of partitions in each generation remains constant.

Periodically, based on a triggering event, e.g., when a partition reaches the maximum age in a generation, or based on a specified time period, the system scrubs the partition by writing a new partition to a next generation that removes or updates information based on the scrubbing tasks created for that partition since the last time it was scrubbed. This is described below with reference to FIGS. 4A and 4B.

Figure 3:
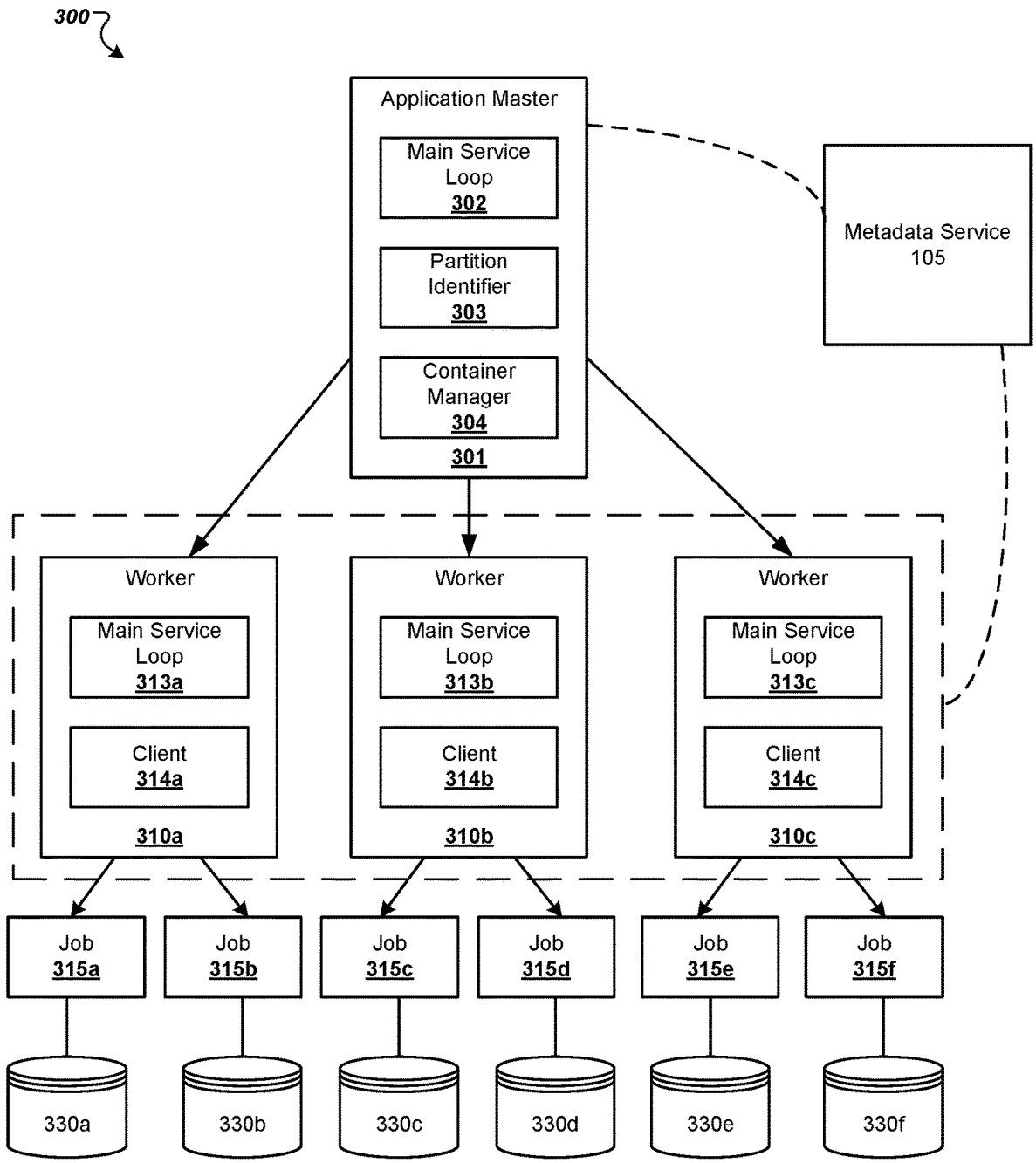
FIG. 3 illustrates a framework for initiating a rolling window scrubbing approach.

FIG. 3 illustrates a framework for initiating a rolling window scrubbing approach 300. Periodically, according to a schedule, an application master 301 initiates a main service loop 302 for a rolling window scrubbing scheme. The application master 301 identifies the events that have occurred since the last time an oldest partition in each generation has been scrubbed. For example, if a user updated an account screenname and a location associated with the user account 2 hours ago, the event is added to an event pipeline, e.g., event pipeline 101 of FIG. 1A, and aggregated with a set of events received within a specified time period. The application master 301 then takes these events and identifies an appropriate scrubbing application that determines corresponding scrubbing to be performed on the oldest partitions of each respective generation. The scrubbing application can be an application that defines scrubbing processes for a particular dataset.

In some implementations, the data retention and modification system provides a standard set of transformation function definitions for developers. A scrubbing task is performed on a particular partition by applying corresponding transformation functions to remove deleted records and fields from the partition or write updated information for updated records and fields.

A developer or dataset owner will need to implement a specific transformation function for each type of personal data tied to deletion or modification events. The scrubbing application will be responsible for joining with the datasets and applying each function to every record in the original data. Implementations of a transformation function should handle both row level and field level deletions as required for each dataset.

In some implementations, the application master 301 is in the coordinator 107 of FIG. 1. In other examples, the application master 301 is started by an application that owns a particular dataset that needs have data cleaned.

The application master 301 schedules and monitors tasks for cleaning a particular dataset. The application master 301 and a cluster of computing nodes, referred to as "workers," together perform the workload of the data processing application. The workload can be divided into tasks by the application master 301 and be assigned to one or more of the workers 310a-310c. A container manager 304 is responsible for monitoring the worker instances and restarting or retrying particular worker tasks as needed. Each worker 310a-310c includes a main service loop 313a-313c and a client 314a-314c. To perform the tasks, the application master 301 can request and fetch data from a distributed file system or database and provide the data to the workers 30a-310c for further processing. The workers 310a-310c perform scrubbing jobs 315a-315f to clean data partitions 330a-330f.

In some alternative implementations, the functionality of the application master and worker tasks can be implemented in one coordinator instance that manages partition identification and tracking as well as starting and managing jobs to clean these partitions. In such an implementation, the layer of separate workers shown in FIG. 3 can be removed and the coordinator instance would directly connect to the jobs layer.

Figure 4B:
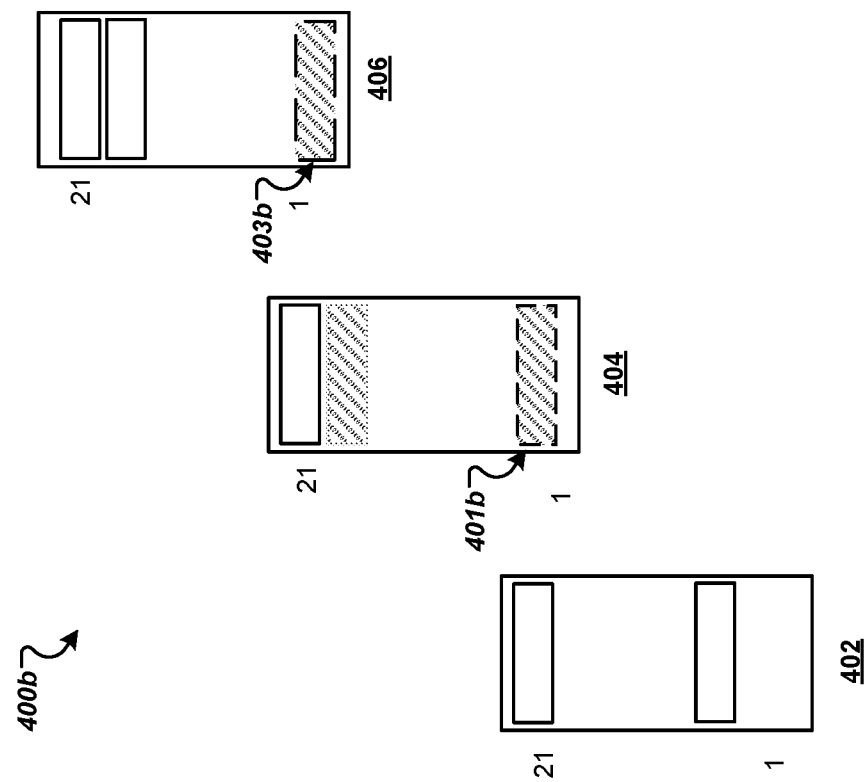
FIG. 4B illustrates the generation of FIG. 4A after the oldest partition has been rolled out of the triggered generation.
Figure 4A:
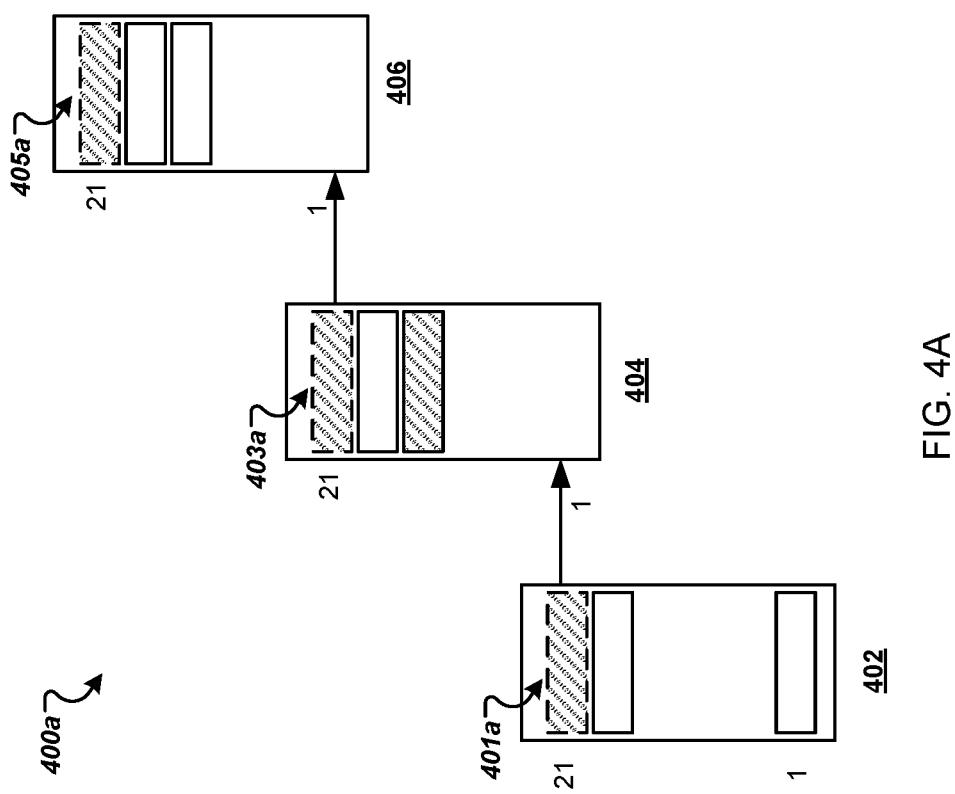
FIG. 4A illustrates generations in which a triggering event has occurred in at least one generation to roll an oldest partition out of the triggered generation.

FIGS. 4A and 4B illustrate an example rolling window scrubbing scheme for modifying and deleting data on a rolling basis for partitions in each generation over a given overall dataset retention period. The rolling window scrubbing scheme as illustrated includes multiple generations, e.g., three generations, of data partitions 402, 404, and 406. As described above, a generation is a construct that includes a specified maximum number of data partitions of the dataset at a time. The generations 402, 404, and 406 each hold 21 partitions.

As new data partitions are added to a dataset, the data retention and modification system adds the partitions into the generation scheme starting at an initial generation 402 and rolling data from the oldest partition in generation 402 to the next generations 404 as partition in the initial generation reaches a specified age, e.g., 21 days.

FIG. 4A illustrates the oldest partitions 401a, 403a, 405a of each generation 402, 404, 406. In FIG. 4A, generation 406 is the last generation of the dataset. Because there are no further generations, the oldest partition 405a has reached the end of the overall retention period for the dataset. Partition 405a is set to inactive and marked for deletion. Partition 405a will be permanently deleted at the end of the deletion period, e.g., 9 days, and metadata associated with the partition will be discarded from the metadata service 105.

The oldest partitions 401a, 403a that are not at the end of the retention period of the dataset are rolled from one generation to the next. To roll an oldest partition from one generation to another, the system marks the oldest partition for deletion in its current generation. Because it is marked for deletion, the deletion and retention service will subsequently delete the partition according to a specified deletion period, e.g., 9 days.

Before this partition is deleted, the system creates a new partition from this oldest partition, cleaning the data of the partition by performing a scrubbing process including one or more scrubbing tasks. The scrubbing tasks are associated with a particular partition. The scrubbing tasks leverage the events that have occurred within a specified time period to properly scrub the partition, e.g., events related to particular PII that needs to be deleted or updated on the partition. The system then adds the new version of the partition to the data set and to the next generation. Additionally, metadata associated with the newly cleaned partition added to the metadata service. Metadata associated with the oldest partition is deleted.

In more detail, in some implementations, when rolling an oldest partition of a generation to a next generation, the system reads the oldest partition into memory and performs scrubbing tasks on the data of the partition to remove or update data from the old partition. This scrubbed data is then written to a new partition for the next generation. The oldest partition is then marked as inactive and a deletion period for the oldest partition begins. This deletion period provides a safety margin for the completion of particular tasks associated with the partition prior to deletion. Therefore, the deletion period may have a duration that is some amount longer than the longest time needed to run a task associated with the partition to ensure that they are completed. Once this deletion period has passed, the oldest partition is deleted.

As illustrated in FIG. 4A, partition 401a is marked for deletion in generation 402 and partition 403a is marked for deletion in generation 404. The system creates a new, clean partition 401b from partition 401a using a scrubbing process as described above. The system also creates a new, cleaned partition 403b from partition 403a using the scrubbing process. The system then adds these new versions of the old partitions to the appropriate generations as illustrated in FIG. 4B. Since partition 401a belonged to generation 402, corresponding partition 401b is rolled as a new partition generation 404. Similarly, since partition 403a belonged to generation 404, corresponding partition 403b is rolled into generation 406. Each rolled partition, as a new partition has an age of "1" in the generation.

As noted above, no corresponding partition for 405a is created since 405a is at the end of the retention period and is merely marked for deletion when the partition is rolled out of generation 406.

In some implementations, for each generation there will be a small number of partitions at the end of the generation that will be kept for a deletion period to allow for rollbacks of the data if a problem occurs during the cleaning process or if a deletion of data is cancelled, e.g., a user changes their mind.

In some alternative implementations, a dataset may only need to undergo a single one time cleaning operation to clean all PII data from the dataset. In other words, PII is only retained for specified period of time, e.g., 30 days, after which corresponding partitions are scrubbed of all PII regardless of any user request to remove the data. An example of a single one time cleaning operation is shown in FIGS. 5A-5B.

Figure 5A:
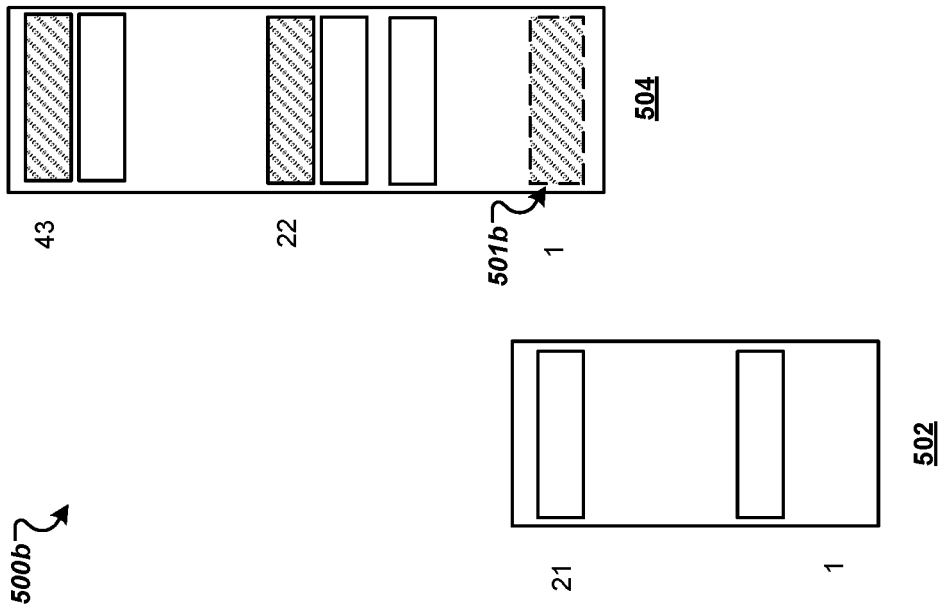
FIG. 5A illustrates a generation scheme that executes a single cleaning operation prior to a cleaning operation has occurred.
Figure 5B:
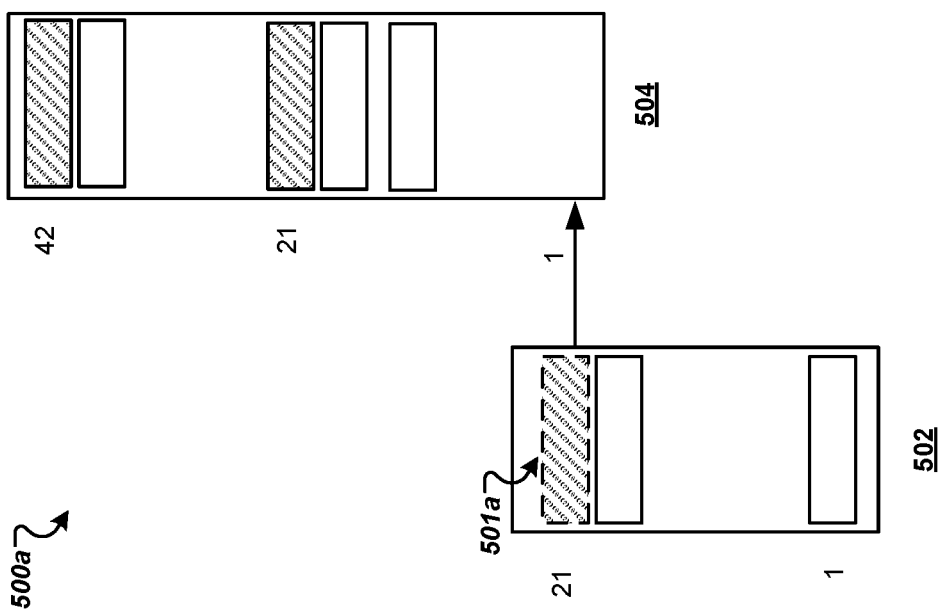
FIG. 5B illustrates the generation scheme of FIG. 5A after the cleaning operation has occurred.

FIGS. 5A and 5B illustrate a generation scheme for a single cleaning operation. This scheme has a first generation 502 containing personal identifying information and a second generation 504 containing the remaining data up to the overall dataset retention period that has undergone a complete personal identifying information scrubbing.

For example, periodically, the system will mark an oldest partition 501a from generation 502 as inactive and subsequently delete the partition from generation 502. A new partition will be created using the data of partition 501a that has undergone a scrubbing of personal identifying information. This is similar to the description above for FIGS. 4A-4B. However, after this new partition, e.g., 501b, is added to the second generation 504 it will be kept until the end of the dataset retention period without being scrubbed for PII again. The second generation 504 may not have a limit on the number of partitions. Moreover, this overall dataset retention period can be very large as it is no longer constrained by any regulatory of policy requirements to remove PII.

An example scenario in which this generation scheme can be applied relates to maintaining particular billing information. For example, it may be important to keep PII for some initial period to aid in predictions or other specific user interactions associated with content provided to the user, e.g., advertisement impressions. However, after that initial period, it may only be required to maintain the billing totals. Therefore, the PII can be scrubbed while retaining the scrubbed data for the remainder of the retention period.

Figure 6A:
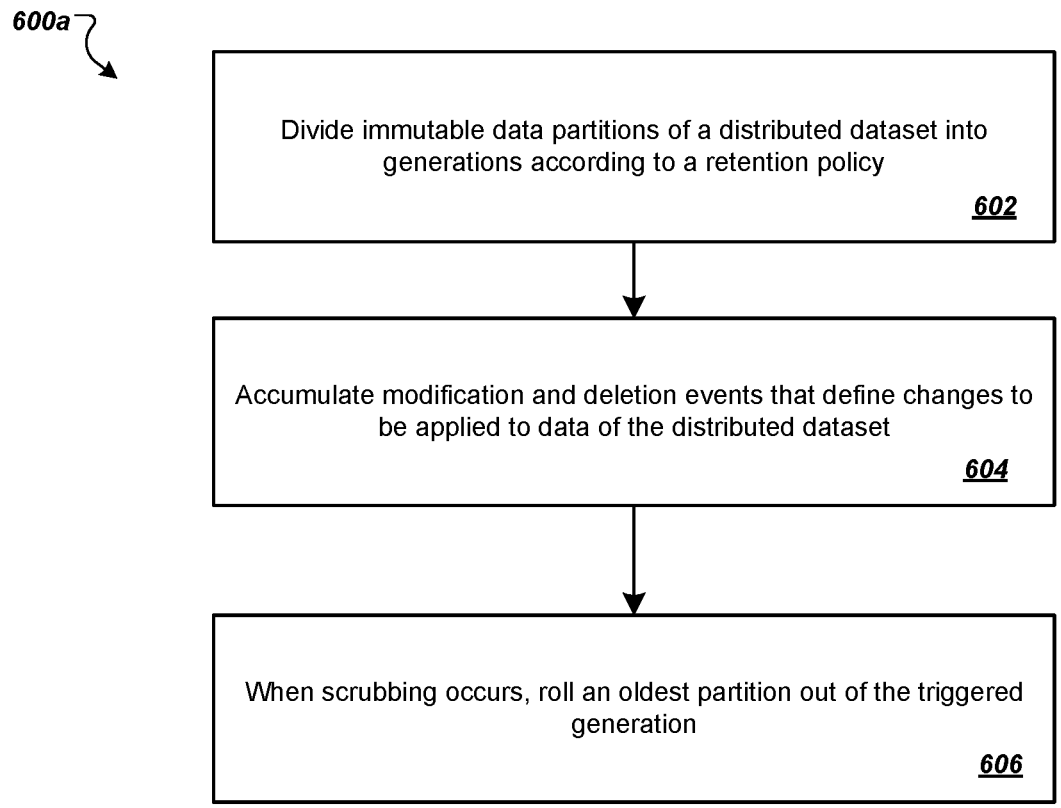
FIG. 6A is a flow chart of an example process for data retention and modification in a distributed dataset.
Figure 6B:
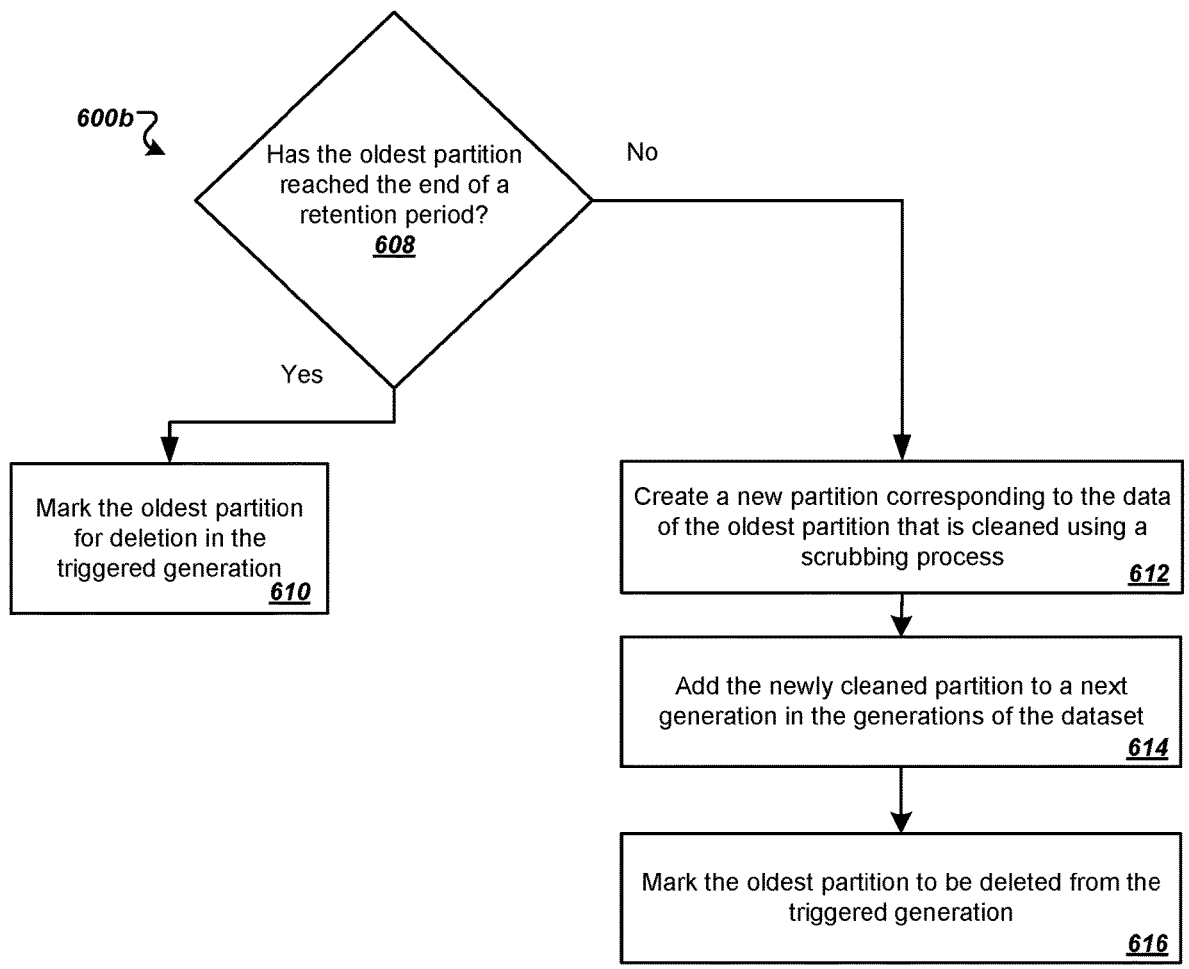
FIG. 6B is a flow chart of an example process for data retention and modification in a distributed dataset.

FIGS. 6A and 6B are a flowcharts of example processes 600a and 600b for data retention and modification in distributed datasets. For convenience, the processes 600a and 600b will be described as being performed by a system of one or more computers, located in one or more locations, and programmed appropriately in accordance with this specification. For example, a data retention and modification system, e.g., the data retention and modification system 100 of FIG. 1, appropriately programmed, can perform the processes 600a and 600b.

As illustrated in FIG. 6A, the system divides immutable partitions of a dataset into generations according to a retention policy (step 602), e.g., based on the overall retention policy length as well as the time period for removing any PII in response to a request. The system also accumulates modification and deletion events that define changes to be applied to data of the distributed dataset (step 604). When scrubbing occurs based on a timing of a rolling scrubbing window, each generation rolls an oldest partition out of the generation (step 606).

FIG. 6B illustrates the rolling window process 600b. The system first determines whether the oldest partition has reached the end of the generations (step 608). If the oldest partition has reached the end of the generations, the oldest partition is marked for deletion and subsequently deleted (step 610). Otherwise, the for all generations other than the final generations, system creates a new partition from the data of the oldest partition of that generation and cleans the partition using a scrubbing process that corresponds to the dataset and the accumulated deletion and modification events since the data was last scrubbed (step 612). The system adds the newly cleaned partition to a next generation in the generations of the dataset (step 614) and marks the oldest partition as inactive to subsequently be deleted from the triggered generation (step 616). In some alternative implementations, the age of the oldest partition is checked before marking the partition for deletion. It is possible that when the scrubbing process has fallen behind, that more than one partition is scrubbed, more than one is deleted, or none have to be deleted.

In some implementations a single generation scrubbing process can be adapted to perform other standard anonymization techniques including, for example, encryption or pseudo-anonymization of the dataset. This maintains personal data in the dataset, but restricts the ability to view and retrieve personal data to a subset of users with access to a decryption key or the lookup table for tokens generated by pseudo-anonymization. The decryption keys and tokens can be deleted outside of the dataset in response to user deletion events.

In some alternative implementations, once a scheme of "generations" and some of the rules are known, a system can be structured to include totally independent processes that handle each generation for each dataset, either with or without the use of a central metadata system.

In some implementations, the data retention scheme can be used to separate out data management responsibilities between different users or organizational units of an enterprise. For example, a given unit may be assigned data ownership for a specific period of time, e.g., 30 days. That unit is responsible for copying partitions older than 21 days into a scrubbed location and managing the dataset there. This copying could be a single or multiple generation scheme. The scrubbed location is then managed by the unit. This separates the responsibilities between the original input and dataset owners.

In some implementations, the data in different generations can be stored differently. For example, the youngest generating may be stored without compression while later generations, that are likely accessed less frequently, can be stored in a compressed format.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of managing data in a distributed dataset stored in partitions, the method comprising:
   dividing the partitions into a plurality of generations;
   accumulating events that define changes to be applied to data of the distributed dataset; and
   in response to a triggering event occurring for a first generation of the plurality of generations, rolling a first partition out of the first generation, the rolling comprising:
      cleaning data of the first partition using a scrubbing process based on the defined changes to be applied to the data in the first partition,
      creating a second partition and adding the second partition to a second generation of the plurality of generations of the dataset,
      writing the cleaned data of the first partition to the second partition in the second generation, and
      marking the first partition for deletion in the first generation.

2. The method of claim 1, wherein the plurality of generations includes a number of generations determined based on one or more of: (i) an overall retention period of the dataset or (ii) an active size of a generation.

3. The method of claim 1, wherein marking the first partition for deletion comprises marking the first partition inactive in the generation for a time period limited by a specified deletion period.

4. The method of claim 1, wherein dividing the partitions into the plurality of generations comprises associating each partition with metadata, the metadata for each partition comprising one or more of: (i) generation information of the partition or (ii) information about when the partition was created.

5. The method of claim 1, wherein adding the second partition to the second generation comprises associating the second partition with metadata comprising one or more of: (i) a time at which the data of the second partition was last cleaned or (ii) generation information of the second partition.

6. The method of claim 1, further comprising, for each of the accumulated events:
   identifying one or more partitions containing data associated with the event;
   generating one or more respective scrubbing tasks for modifying the data in the one or more partitions; and
   executing the respective scrubbing tasks on a schedule based on a rolling window of partition scrubbing.

7. The method of claim 1, further comprising, responsive to a subsequent triggering event:
   determining that a problem has occurred in creating the second partition; and
   performing a partition roll back on first partition to restore the data prior to creating the second partition.

8. One or more non-transitory computer storage media encoded with instructions that, when executed by one or more computers, cause the one or more computers to perform operations for managing data in a distributed dataset stored in partitions, the operations comprising:
   dividing the partitions into a plurality of generations;
   accumulating events that define changes to be applied to data of the distributed dataset; and
   in response to a triggering event occurring for a first generation of the plurality of generations, rolling a first partition out of the first generation, the rolling comprising:
      cleaning data of the first partition using a scrubbing process based on the defined changes to be applied to the data in the first partition,
      creating a second partition and adding the second partition to a second generation of the plurality of generations of the dataset,
      writing the cleaned data of the first partition to the second partition in the second generation, and
      marking the first partition for deletion in the first generation.

9. The non-transitory computer storage media of claim 8, wherein the plurality of generations includes a number of generations determined based on one or more of: (i) an overall retention period of the dataset or (ii) an active size of a generation.

10. The non-transitory computer storage media of claim 8, wherein marking the first partition for deletion comprises marking the first partition inactive in the generation for a time period limited by a specified deletion period.

11. The non-transitory computer storage media of claim 8, wherein dividing the partitions into the plurality of generations comprises associating each partition with metadata, the metadata for each partition comprising one or more of: (i) generation information of the partition or (ii) information about when the partition was created.

12. The non-transitory computer storage media of claim 8, wherein adding the second partition to the second generation comprises associating the second partition with metadata comprising one or more of: (i) a time at which the data of the second partition was last cleaned or (ii) generation information of the second partition.

13. The non-transitory computer storage media of claim 8, the operations further comprising, for each of the accumulated events:
   identifying one or more partitions containing data associated with the event;
   generating one or more respective scrubbing tasks for modifying the data in the one or more partitions; and
   executing the respective scrubbing tasks on a schedule based on a rolling window of partition scrubbing.

14. The non-transitory computer storage media of claim 8, the operations further comprising, responsive to a subsequent triggering event:
   determining that a problem has occurred in creating the second partition; and
   performing a partition roll back on first partition to restore the data prior to creating the second partition.

15. A system comprising one or more computers and one or more storage devices storing instructions that are operable, when executed by the one or more computers, to cause the one or more computers to perform operations for managing data in a distributed dataset stored in partitions, the operations comprising:
   dividing the partitions into a plurality of generations;
   accumulating events that define changes to be applied to data of the distributed dataset; and
   in response to a triggering event occurring for a first generation of the plurality of generations, rolling a first partition out of the first generation, the rolling comprising:
      cleaning data of the first partition using a scrubbing process based on the defined changes to be applied to the data in the first partition,
      creating a second partition and adding the second partition to a second generation of the plurality of generations of the dataset, writing the cleaned data of the first partition to the second partition in the second generation, and marking the first partition for deletion in the first generation.

16. The system of claim 15, wherein the plurality of generations includes a number of generations determined based on one or more of: (i) an overall retention period of the dataset or (ii) an active size of a generation.

17. The system of claim 15, wherein marking the first partition for deletion comprises marking the first partition inactive in the generation for a time period limited by a specified deletion period.

18. The system of claim 15, wherein dividing the partitions into the plurality of generations comprises associating each partition with metadata, the metadata for each partition comprising one or more of: (i) generation information of the partition or (ii) information about when the partition was created.

19. The system of claim 15, wherein adding the second partition to the second generation comprises associating the second partition with metadata comprising one or more of: (i) a time at which the data of the second partition was last cleaned or (ii) generation information of the second partition.

20. The system of claim 15, the operations further comprising, for each of the accumulated events:

identifying one or more partitions containing data associated with the event;

generating one or more respective scrubbing tasks for modifying the data in the one or more partitions; and executing the respective scrubbing tasks on a schedule based on a rolling window of partition scrubbing.

21. The system of claim 15, the operations further comprising, responsive to a subsequent triggering event:

determining that a problem has occurred in creating the second partition; and performing a partition roll back on first partition to restore the data prior to creating the second partition.

* * * * *